United States Patent
Lennhager et al.

(10) Patent No.: US 12,390,757 B2
(45) Date of Patent: Aug. 19, 2025

(54) AIR FILTERING APPARATUS

(71) Applicant: CAMFIL POWER SYSTEMS AB, Borås (SE)

(72) Inventors: Andreas Lennhager, Kinna (SE); Mikael Savinger, Molnlycke (SE); Magnus Sturesson, Marback (SE)

(73) Assignee: Camfil AB, Stockholm (SE)

( * ) Notice: Subject to any disclaimer, the term of this patent is extended or adjusted under 35 U.S.C. 154(b) by 451 days.

(21) Appl. No.: 17/924,957

(22) PCT Filed: May 3, 2021

(86) PCT No.: PCT/SE2021/050411
§ 371 (c)(1),
(2) Date: Nov. 11, 2022

(87) PCT Pub. No.: WO2021/230790
PCT Pub. Date: Nov. 18, 2021

(65) Prior Publication Data
US 2023/0182063 A1 Jun. 15, 2023

(30) Foreign Application Priority Data
May 13, 2020 (SE) .................................. 2050557-4

(51) Int. Cl.
*B01D 46/88* (2022.01)
*B01D 46/00* (2022.01)
(Continued)

(52) U.S. Cl.
CPC ......... *B01D 46/88* (2022.01); *B01D 46/0002* (2013.01); *B01D 46/2403* (2013.01);
(Continued)

(58) Field of Classification Search
None
See application file for complete search history.

(56) References Cited

U.S. PATENT DOCUMENTS

| 7,008,465 | B2 | 3/2006 | Graham et al. |
| 9,200,568 | B1 | 12/2015 | Kippel et al. |

(Continued)

FOREIGN PATENT DOCUMENTS

| CN | 105531012 A | 4/2016 |
| CN | 107269394 A | 10/2017 |

OTHER PUBLICATIONS

United Arab Emirates Office Action for Application No. P6002356/22 dated Mar. 10, 2025.
(Continued)

*Primary Examiner* — Brit E. Anbacht
(74) *Attorney, Agent, or Firm* — Patterson + Sheridan, LLP

(57) ABSTRACT

The disclosure relates to an air filtering apparatus (1) configured to provide intake air to an engine, said apparatus comprising: a filter chamber (2) comprising an air inlet opening (3), and an air outlet opening (4); a weather protection hood (5) arranged on the air inlet side of the filter chamber, said weather protection hood having an air intake opening (6) facing downward and an outlet opening (7) being connected to the air inlet opening (3) of the filter chamber; a pulse filter arrangement (8) comprising one or more pulse filters (9); a static filter arrangement (10) located at the air outlet opening (4); where the pulse filter arrangement (8) is arranged inside the weather protection hood (5) and in that a maintenance space (11) is provided in the filter chamber (2) on a downstream side of the pulse filter arrangement (8), through which the filters (9) of the pulse filter arrangement can be replaced.

10 Claims, 2 Drawing Sheets

(51) Int. Cl.
  *B01D 46/24* (2006.01)
  *B01D 46/58* (2022.01)
  *B01D 46/62* (2022.01)
  *F02M 35/024* (2006.01)

(52) U.S. Cl.
  CPC ............. *B01D 46/58* (2022.01); *B01D 46/62* (2022.01); *F02M 35/024* (2013.01); *B01D 2279/60* (2013.01)

(56) References Cited

U.S. PATENT DOCUMENTS

| | | | |
|---|---|---|---|
| 12,290,772 B2* | 5/2025 | Janikowski | B01D 39/2017 |
| 2008/0141636 A1* | 6/2008 | Singh | F02C 7/055 |
| | | | 96/108 |
| 2010/0054919 A1 | 3/2010 | Hiner et al. | |
| 2011/0083419 A1 | 4/2011 | Upadhyay et al. | |
| 2011/0252763 A1 | 10/2011 | Mann | |
| 2011/0277441 A1 | 11/2011 | Ayshford | |
| 2013/0008313 A1 | 1/2013 | Handley et al. | |
| 2013/0232932 A1 | 9/2013 | Jarrier | |
| 2014/0123621 A1 | 5/2014 | Driessens et al. | |
| 2014/0251129 A1* | 9/2014 | Upadhyay | B01D 46/12 |
| | | | 96/400 |
| 2015/0007720 A1* | 1/2015 | Vu | B01D 46/76 |
| | | | 95/20 |
| 2015/0033681 A1* | 2/2015 | Santini | B01D 46/44 |
| | | | 55/309 |
| 2015/0219010 A1 | 8/2015 | Santini et al. | |
| 2016/0032836 A1 | 2/2016 | Hawkinson et al. | |
| 2016/0096134 A1* | 4/2016 | Santini | B01D 46/645 |
| | | | 55/487 |
| 2017/0320004 A1* | 11/2017 | Allegorico | B01D 46/446 |
| 2018/0015403 A1 | 1/2018 | Kippel et al. | |
| 2019/0247776 A1 | 8/2019 | Handte et al. | |
| 2019/0247778 A1 | 8/2019 | Handte et al. | |

OTHER PUBLICATIONS

European Search Report for Application No. 21803978.2 dated Apr. 23, 2024.
International Search Report and Written Opinion for PCT Application SE2021/050411 dated Jun. 23, 2021.
Swedish Office Action for Application 2050557-4 dated Oct. 19, 2020.
Japanese Office Action for Application No. 2022-566051 dated Apr. 11, 2025.
Chinese Office Action for Application No. 202180033565.8 dated Jun. 12, 2025.

* cited by examiner

AIR FILTERING APPARATUS

TECHNICAL FIELD

The present disclosure relates to an air filtering apparatus configured to provide intake air to an engine.

BACKGROUND ART

Turbomachinery equipment are critical pieces of equipment that ingest large quantities of air. Air quality is critical for the performance and life of the equipment and directly impacts an operator's availability, reliability and profitability. Turbomachines, such as industrial air compressors, gas turbines etc. often operate in severe environments, such as rural, urban or industrial environments containing various types of pollution and particulate matter. Intake air needs to be cleaned before being provided to the machine, or otherwise the impurities in the air intake may damage the engine or causing it to lose efficiency. A filter system comprising static filters is thus usually arranged upstream of the air inlet plenum of the engine, in order to prevent or limit damages which can be caused to the machinery components by dust or particles contained in the air ingested by the machine.

Upstream pulse filters can be used in order to extend the life of the static filters by removing the most coarse part of solid contaminants contained in the air. The media elements of air intake pulse filters tend to get clogged by environmental conditions such as fog, rain, snow, dust etc. and are therefore to be frequently cleaned by pulsing compressed air through the filter media counter-current to the intake air direction, thereby maintaining filtration efficiency and improving the life time of the pulse filters. However, both pulse filters and other filters downstream of the pulse filters eventually need to be replaced at their end of life. It is therefore necessary that all filter units can be accessed by maintenance staff. US2015/114229A1 discloses an example of how pulse filters can be accessed for replacement from a maintenance space.

Turbomachinery facilities are typically very large installations, ingesting large quantities of air, and there is a desire to provide effective intake air filter systems for these facilities.

SUMMARY OF THE INVENTION

The present disclosure aims at providing an improved air filtering apparatus configured to provide intake air to an engine. The apparatus comprises a filter chamber comprising an air inlet opening, and an air outlet opening; a weather protection hood arranged on the air inlet side of the filter chamber, the weather protection hood having an air intake opening facing downward and an outlet opening being connected to the air inlet opening of the filter chamber; a pulse filter arrangement comprising one or more filters; and a static filter arrangement located at the air outlet opening. The pulse filter arrangement is arranged inside the weather protection hood. A maintenance space, through which the filters of the pulse filter arrangement can be replaced, is provided in the filter chamber on a downstream side of the pulse filter arrangement.

The pulse filters of the pulse filter arrangement are suitably arranged in the weather protection hood such that any particles released from the particle capturing surface of the filters during a pulse cleaning mode can fall freely from the filters and out through the air intake opening of the weather protection hood. The filters of the pulse filter arrangement are advantageously cartridge filters, which are positioned such that the particle capturing surfaces thereof are substantially vertical or facing downward.

The weather protection hood may comprise a pulse filter mounting structure suitably configured to divide the interior space of the weather protection hood into an upstream space on the upstream side of the structure and a downstream space on the downstream side of the structure, and the filters are advantageously arranged in this upstream space. The upstream space is preferably accessible from the maintenance space through one or more hatches or cover plates provided in a wall between the weather protection hood and maintenance space of the filter chamber.

The maintenance space is suitably provided upstream of the static filter arrangement. The static filter arrangement may preferably comprise a plurality of static filters, which are arranged to be accessible from the maintenance space.

The air filtering apparatus preferably comprises a plurality of weather protection hoods connected to air inlet openings in the filter chamber, where each weather protection hood comprises a pulse filter arrangement. The weather protection hoods are suitably arranged above one another. The air filtering apparatus may comprise 2-10 weather protection hoods with pulse filter arrangements connected to the air inlet openings of the filter chamber.

The air filtering apparatus may further comprise an engine air intake duct connected to the outlet opening of the filter chamber, and may advantageously be configured to provide intake air to a gas turbine.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the parts or elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1:
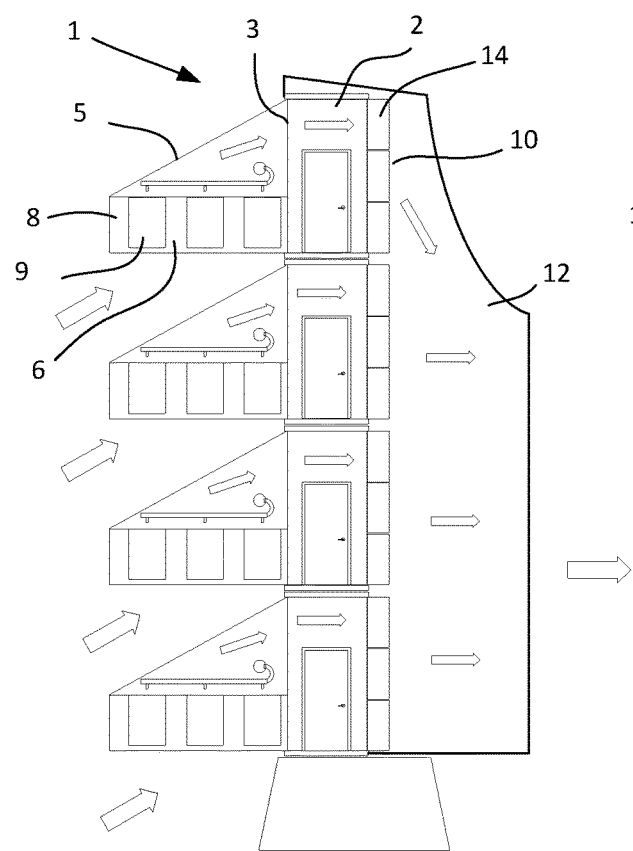
FIG. 1 is a schematic illustration of an air filtering apparatus according to an embodiment of the present disclosure.

The present disclosure relates to an improved air filtering apparatus configured to provide intake air to an engine. The air filtering apparatus comprises a static filter arrangement located in a filter chamber at an outlet opening thereof. The static filter arrangement serves to clean intake air to provide clean air suitable for use in an engine, and may suitably be compact filters (e.g. with pleated filter media) or EPA or HEPA filters. A final stage of HEPA filter provides a barrier against the smallest and most corrosive particles in order to reduce or eliminate corrosion and fouling.

The static filter arrangement is suitably adapted according to the operating conditions at the facility, and can be designed to include from around 20 filters to several hundred filters depending on the size of the facility. If desired, the static filter arrangement can include multiple filter stages. For example a first static filter stage can include a set of panel or bag filters, and a second static filter stage can include compact filters or EPA or HEPA filters.

A weather protection hood is arranged on an air inlet side of the filter chamber to prevent rain and snow from entering the filter chamber. The weather protection hood comprises an outwardly inclined top surface and has an air intake opening facing downward and an air outlet opening being connected to the air inlet opening of the filter chamber. The outwardly inclined top surface weather protection hood allows any water, snow or debris present on the top surface to slide along and fall off from the surface and out of range from the air intake opening.

A plurality of pulse filters are mounted in a filter mounting structure, which is suitably configured to divide the interior space of the weather protection hood into an upstream space on the upstream side of the filter mounting structure and a downstream space on the downstream side of the filter mounting structure, and the filters advantageously extend into the upstream space. The hood is configured to close off the downstream space, so as to form a closed hood which fully protects the inlet opening of the filter chamber. This can be obtained for example by providing side walls or covers on each side of the inclined top surface, or by providing a curved inclined top surface which covers the inlet opening of the filter chamber.

The weather protection hood suitably also comprises side walls arranged around the filters of the pulse filter arrangement, in the upstream section of the hood, preferably on all sides which are not directed toward the filter chamber. The side walls are suitably arranged in a lateral direction, advantageously extending from the inclined top surface to a point corresponding to or lower than the lowest end of the pulse filters. The side walls are weather protecting to the filters of the pulse filter arrangement and also decreases the risk of materials sliding off the inclined top surface entering the air intake. The weather protection hood can also be provided with mesh screens to prevent undesired objects from entering, and a droplet separator can be included for mist and moisture protection.

A pulse filter arrangement comprising one or more filters is arranged inside the weather protection hood. The pulse filters serve to protect rotating machinery operating in high dust load environment. The pulse filter arrangement is equipped with pulse filters, which are suitably single stage automatic self-cleaning barrier filters. The cleaning takes place during normal operation by injecting compressed air into a number of filters in reverse-flow direction without interrupting the normal air flow through the pulse filter arrangement, thus allowing full continuous operation at low stable pressure drop even in extremely dusty environments. In addition, operation may only need to be interrupted at the time of replacement of the filters, resulting in increased availability, less frequent shutdowns and reduced maintenance costs. Compressed air injection means is arranged downstream of and adjacent the pulse filters. The static filters protect the engine from any particles that may fall off the pulse filter inside the maintenance space. Accordingly, the pulse filters can be replaced also during operation.

The filters of the pulse filter arrangement are advantageously arranged in the weather protection hood such that any particles released from their particle capturing surfaces during a pulse cleaning mode can fall freely from the filters and out through the air intake opening of the weather protection hood. Thereby, no special installation is needed to collect the particles or dust pulsed off the filters. The particles or dust pulsed off the filters can easily slide off the inclined top surface of the weather protection hood. When several weather protection hoods are arranged on top of each other, side walls arranged around the filters of the pulse filter arrangement, prevent pulsed off dust or particles from a higher pulse filter arrangement from re-entering the air filtering apparatus through the air intake opening of a pulse filter arrangement arranged below.

A pulse filter mounting structure can be used to support the filters of the pulse filter arrangement, and the pulse filters preferably include a frame or mounting plate which can be sealingly mounted to the pulse filter mounting structure. The filters of the pulse filter arrangement advantageously comprise filter elements forming a cylindrical and/or conical particle capturing surfaces, and a mounting plate or fixture (i.e. cartridge filters), which are positioned such that the particle capturing surfaces thereof are substantially vertical or facing downward, and the dust pulsed can thus drop freely out of the weather protection hood, and is not caught by another particle capturing surface.

The cross section of the cylindrical and/or conical filter elements can be circular or have any other shape, such oval, rectangular, or any other polygon. The filters can comprise multiple panels/panel elements.

A suitable pulse filter is described in US2019/0247776A1 and US2019/0247778A1. This filter type greatly expands the usable surface area of cartridges, and the inner cone is configured so that pulsed air is evenly distributed top to bottom along the outer pack of the filter and down through the inner cone pack. Thereby airflow is maximised while filter change-outs, compressed air usage and energy costs are minimised, giving a powerful and cost-efficient dust collection.

These filters comprise a filter cartridge and a mounting plate. The filter cartridge includes a cylindrical filter element, inside which a conical or cylindrical filter insert is inserted, coaxially with the filter element. Thereby, an inner ring-shaped space is formed within the filter cartridge in the area between the filter element and the filter insert. The filter insert can be conical, with its smaller end directed towards the cap. The outer diameter of the filter insert can increase linearly or increase in a non-linear manner so that a radial outer surface of the filter insert has a curved configuration. Alternatively, the filter insert can be cylindrical. The filter material of the filter element and of the filter insert is designed so that it is cleaned when a stream if compressed air flows against the flow direction of the intake air to be filtered.

The filter cartridge further includes a cap in the form of a flow guiding device which is disposed and designed with respect to its external shape so that the compressed air flow is widened by the cap such that the entire filter material of the filter element is covered by the compressed air flow and an accompanying loss of energy is minimized. The filter element and the filter insert both suitably have an arc-shaped cross section. The cap is secured to the filter insert, and has a parabolic cross-section, i.e. the cap corresponds to a parabola being rotated about the longitudinal axis of the parabola.

At an end of the filter cartridge, a filter bottom/annular component is arranged between the filter element and the filter insert, which connects the filter element to the filter insert. A direction pointing from the top to the bottom in the drawings will hereinafter be referred to as a first axial direction, while a direction opposite to the first axial direction will be referred to as second axial direction. The annular component/filter bottom is formed to be air-impermeable so that the dirty air flow outside the filter cartridge may enter into the inner space either from the outside to the inside through the filter material of the filter element or from an inner area disposed radially inside the filter insert to the outside through the filter material of the filter insert.

During filtering operation of the filter cartridge, the dirty air flow flows into the inner space of the filter cartridge. For cleaning the filter cartridge supply of a dirty air flow is interrupted and compressed air is applied to the filter material of the filter cartridge against the flow direction during the filtering operation. I.e. a compressed air flow in the form of a compressed air blast flows in the direction of the first axial direction and impinges on the filter cartridge. By the cap the compressed air flow is guided into the annular part of the inner space so that it flows from the inside to the outside through the filter material of the filter element and from the outside to the inside through the filter material of the filter insert into the inner zone and frees particles accumulated in the filter material such as e.g. dust. The freed particles then drop downwards in the direction of gravity.

The cap can be disposed completely within the filter cartridge. Alternatively the cap may be configured so that an end piece thereof protrudes from the filter element in the axial direction and a base body thereof is disposed inside the filter element. In this way, the compressed air flow is widened already in the axial direction more closely to the nozzle so that an axial distance between the nozzle and the filter cartridge can be reduced. The end piece and the base body of the cap can be formed integrally or separately from each other.

When the end piece and the base body of the cap are formed separately from each other the end piece of the cap can be connected the pulse filter mounting structure inside the weather protection hood, and the base body of the cap is connected to the filter cartridge. The end piece and the base body need not be interconnected, it is sufficient when they are arranged to be adjacent each other. The base body can thus take the shape of a parabolic frustum. When a filter cartridge is replaced, the end piece of the cap is retained in the pulse filter mounting structure.

The pulse filters are suitably arranged in rows in the weather protection hood, where each row includes a plurality of pulse filters, and a plurality of rows can be arranged side by side in the hood. The pulse filter mounting structure can be in the form of parallel profiles positioned so that the pulse filters of each row can be inserted horizontally into the mounting structure, one after another. Gaskets or other sealing means can be positioned on the mounting structure and/or on the frame or mounting plate of the filter. The pulse filter mounting structure and the sealingly mounted filter elements will thus in combination divide the interior of the weather protection hood in a dirty upstream side and a clean downstream side.

Accordingly, the interior space of the weather protection hood including the pulse filter holding frame will be divided into an upstream space on an upstream side of the pulse filter arrangement, and a downstream space on a downstream side of the pulse filter arrangement. The filter elements will thus be arranged to extend into the upstream (dirty) space.

A maintenance space or corridor for pulse filter replacement is provided in the filter chamber on a downstream (clean) side of the pulse filter arrangement, and is arranged so that the filters of the pulse filter arrangement held in the weather protection hood can be accessed from the maintenance space allowing the filters to be replaced. This can be obtained by the presence of one or more hatches or cover plates provided in a wall between the weather protection hood and maintenance space of the filter chamber, through which the upstream space of the weather protection hood and hence the pulse filters are accessible for replacement. When closed, these hatches or cover plates separate the maintenance space, which is on the clean side, from the upstream weather protection hood space, which is on the dirty side. This means that the pulse filters are replaced from the downstream side. The filters are replaced horizontally by extracting them from the weather protection hood after having opened the hatch or cover plate. The static filter protects the engine from any particles that may fall off the pulse filter inside the maintenance space during the maintenance operation.

The maintenance space is typically dimensioned such that maintenance staff can easily and safely enter the maintenance space via stairs and doors and conveniently access the filters to be replaced. By enabling pulse filter replacement from the downstream clean side maintenance space, outdoor scaffolding is not needed at the weather protection hoods for this purpose, thus reduced cost and improved work safety.

The maintenance space is suitably provided upstream of the static filter arrangement, with the static filters accessible from the maintenance space. Thereby, the static filters can be replaced from the same maintenance space as the pulse filters and the air filtration facility can be made more compact. The static filter arrangement may comprise a plurality of filters, depending on the requirements of the engine to which clean air is to be provided.

Depending on the size of the air filtration facility and the size of air intake requirement, the air filtering apparatus may preferably comprise a plurality of weather protection hoods connected to air inlet openings in the filter chamber, which may suitably be arranged above one another and/or side by side. Each weather protection hood with the pulse filter arrangement included therein corresponds to a set of static filters. For example, in one set, 4-18 static filters can be arranged side by side and 3-10 static filters may be attached on top of each other. Typically, the pulse filter arrangement may comprise 4-6 static filters may be attached on top of each other. The width of a weather protection hood and the corresponding set of static filters can be about 3-12 m, and the height can be about 3-5 m. The pulse filters may be arranged in rows in the weather protection hood, where each row can include for example 3-8 pulse filters, and 3-25 rows can be arranged side by side in the hood. The depth of the weather protection hood will typically be adapted to the number of pulse filters comprised in one row.

An air filtering apparatus according to the present disclosure may for example comprise 2-10 weather protection hoods, each including a pulse filter arrangements, and being connected to the air inlet opening of the filter chamber. Each pulse filter arrangement comprised in a weather protection hood will be accessible from the maintenance space, via hatches or cover plates as described above. Platforms may be arranged in the maintenance space for each weather protection hood.

The air filtering apparatus may further comprise an engine air intake duct configured to be connected to the outlet opening of the filter chamber. The air filtering apparatus can provide clean air to any type of turbomachinery equipment, and is in particular advantageously configured to provide intake air to a gas turbine.

Description of Exemplifying Embodiments

The air filtering apparatus of the present disclosure will now be described with reference to the accompanying drawings, in which preferred example embodiments of the disclosure are shown. The air filtering apparatus may, however, be embodied in other forms and should not be construed as limited to the herein disclosed embodiments. The disclosed embodiments are provided to fully convey the scope of the disclosure to the skilled person.

Figure 3:
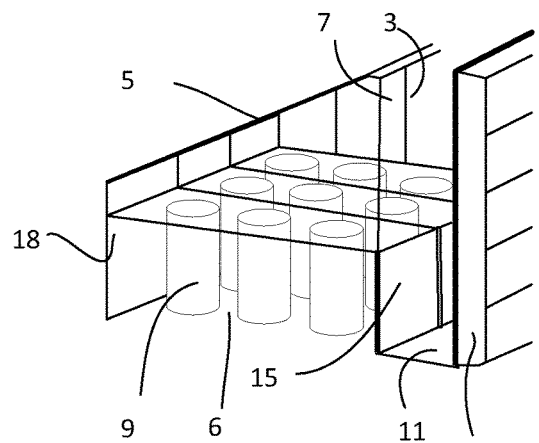
FIG. 3 is a schematic perspective view of a weather protection hood, maintenance space and static filter arrangement according to an embodiment of the present disclosure.
Figure 2:
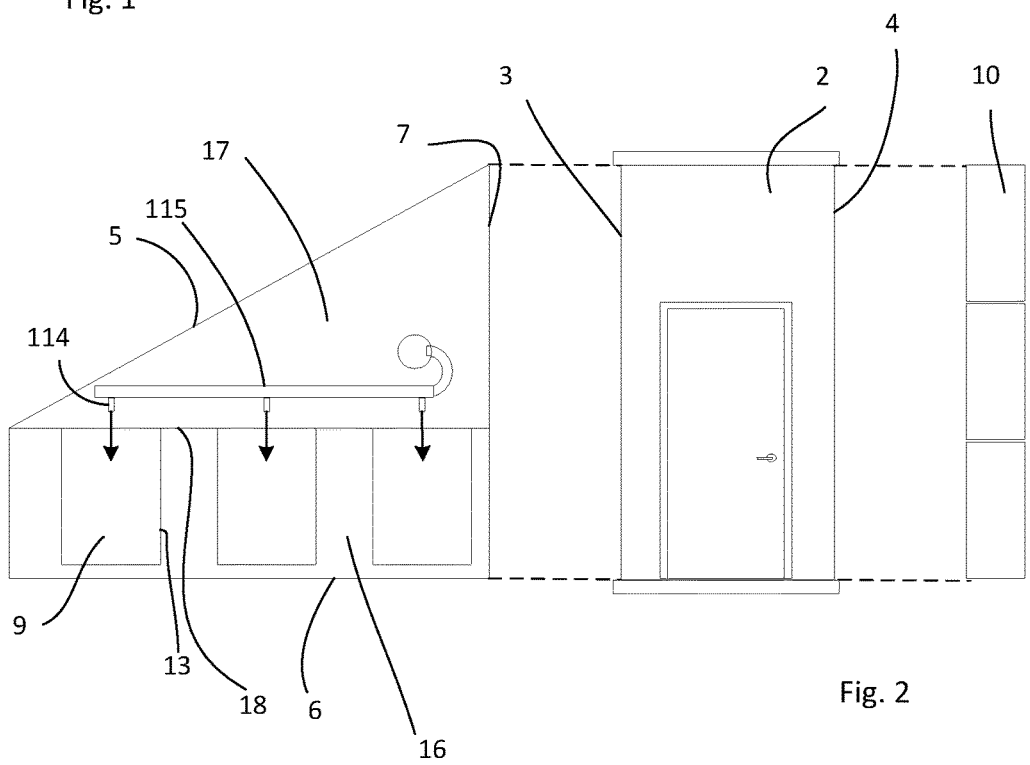
FIG. 2 is a schematic partially exploded view of a part of the of the air filtering apparatus in FIG. 1.

FIG. 1 is a schematic illustration of an air filtering apparatus according to an embodiment of the present disclosure, FIG. 2 is a schematic partially exploded view of a part of the of the air filtering apparatus in FIG. 1, and FIG. 3 is a schematic perspective of a weather protection hood, maintenance space and static filter arrangement. The same reference numbers are used for the same or corresponding elements or components throughout the drawings.

FIG. 1 shows an air filtering apparatus 1 according to an embodiment of the present disclosure configured to provide intake air to an engine (not shown). In this embodiment, side walls are provided on the weather protection hood, and the side wall closest to the viewer is not shown in the drawing. The arrows indicate the intake air flow direction through the air filtering apparatus. The apparatus comprises a filter chamber 2 comprising an air inlet opening 3 and an air outlet opening 4. A weather protection hood 5 is arranged on the air inlet side (at the air inlet opening 3) of the filter chamber, and has an air intake opening 6 facing downward and an outlet opening 7, which is connected to the air inlet opening 3 of the filter chamber. A pulse filter arrangement 8 comprising one or more filters 9 is arranged inside the weather protection hood. A static filter arrangement 10 is located at the air outlet opening 4 of the filter chamber. A maintenance space 11 is provided in the filter chamber 2 on a downstream side of the pulse filter arrangement 8, via which the filters 9 of the pulse filter arrangement can be replaced.

The pulse filters 9 are arranged in the weather protection hood 5 such that any particles released from the particle capturing surface 13 of the pulse filters during a pulse cleaning mode can fall freely from the filters and out through the air intake opening 6 of the weather protection hood 5.

The filters of the pulse filter arrangement 8 may preferably be cartridge filters, which are positioned such that the particle capturing surfaces 13 thereof are substantially vertical or facing downward.

As seen best in FIGS. 2 and 3, the weather protection hood 5 can comprise a pulse filter holding structure 18, which is configured to divide the interior space of the weather protection hood 5 into an upstream space 16 on the upstream side of the mounting structure 18 and a downstream space 17 on the downstream side of the mounting structure 18. The pulse filters preferably include a frame or mounting plate (not shown) which can be sealingly mounted to the pulse filter mounting structure, and the pulse filter mounting structure combined width the mounted filters will divide the interior of the weather protection hood in a dirty upstream side and a clean downstream side. As shown in the Figures, the pulse filters are arranged in the upstream space 16. The upstream space is accessible from the maintenance space 11 through one or more hatches or cover plates 15 provided in a wall between the weather protection hood and maintenance space 11 of the filter chamber. FIG. 2 also shows a pulse cleaning compressed air device 115 positioned above the pulse filters with nozzles 114 designed to eject a stream of compressed air from the nozzle for impinging on the filter material. The arrows in FIG. 2 shows the compressed air flow direction.

As illustrated, the maintenance space 11 is provided upstream of the static filter arrangement 10. The static filter arrangement may comprise a plurality of static filter 14, which are arranged to be accessible from the maintenance space for replacement thereof.

FIG. 1 illustrates how a plurality of weather protection hoods 5 can be arranged above one another and be connected to air inlet openings 3 in the filter chamber 2, where each of the weather protection hoods comprises a pulse filter arrangement 8. In the shown example 4 weather protection hoods with pulse filter arrangements 8 are connected to the air inlet openings 3 of the filter chamber.

FIG. 1 illustrates how the air filtering apparatus comprises an engine air intake duct 12 connected to the outlet opening 4 of the filter chamber. As mentioned above the duct 12 can be configured to provide intake air to a gas turbine.

Figure 4:
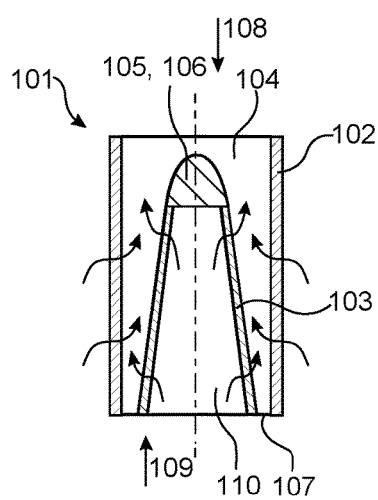
FIG. 4 is a schematic illustration of a preferred type of filter cartridge.

FIG. 4 illustrates a filter cartridge of the preferred type. The filter cartridge 101 includes a cylindrical filter element 102 made from filter material. In the cylindrical filter element 102 a filter insert 103 made from filter material is inserted, coaxially with the filter element 102. Thus, an inner ring-shaped space 104 is formed within the filter cartridge 101 in the area between the filter element 102 and the filter insert 103. The filter cartridge 101 includes a cap 106 in the form of a flow guiding device 105. As shown in FIG. 1, the cap 106 can be disposed completely within the filter cartridge 101. A filter bottom/annular component 107 is arranged between the filter element 102 and the filter insert 3, at an end of the filter cartridge 101, thereby connecting the filter element 102 to the filter insert 103.

A direction pointing from the top to the bottom in FIG. 1 is a first axial direction 108, while a direction opposite to the first axial direction is a second axial direction 109. The annular component/filter bottom 107 is formed to be air-impermeable so that the dirty air flow outside the filter cartridge 101 may enter into the inner space 104 either from the outside to the inside through the filter material of the filter element 102 or from an inner area 110 disposed radially inside the filter insert 103 to the outside through the filter material of the filter insert 103. The flow path of the dirty air flow is indicated by arrows in FIG. 4.

The filter material of the filter element 102 and of the filter insert 103 is designed so that it is cleaned when a stream of compressed air from a compressed air supply 113, ejected from the compressed air tube 115 through the nozzles 114 flows in a direction 108 against the flow direction 109 of the intake air to be filtered and frees particles accumulated in the filter material, which then drop downwards in the direction of gravity.

In the filter cartridge 101 shown in FIG. 4, the filter insert 103 is conical, with its smaller end directed towards the cap.

Figure 5:
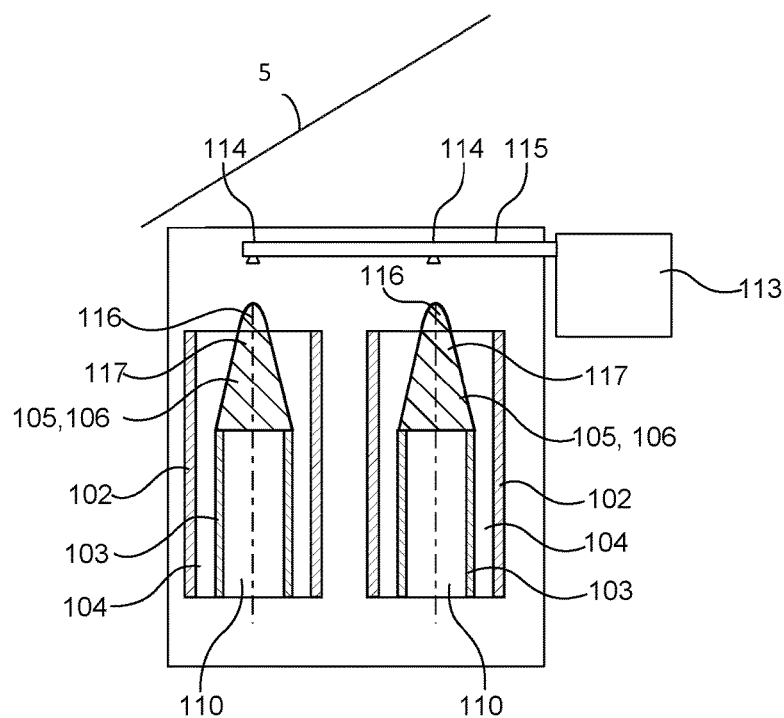
FIG. 5 is a schematic illustration of another preferred type of filter cartridge together with sections of hood and a pulse cleaning compressed air device.

As shown in FIG. 5, the cap 106 can be configured so that an end piece 116 thereof protrudes from the filter element 102 in the axial direction and a base body 117 is disposed inside the filter element 102. The end piece 116 and the base body 117 of the cap 106 can be formed integrally or separately from each other. FIG. 5 also illustrates the compressed air tube 115 and the nozzles 114 through which compressed air flows in a direction against the flow direction of the intake air during pulse cleaning of the filters.

Figure 6:
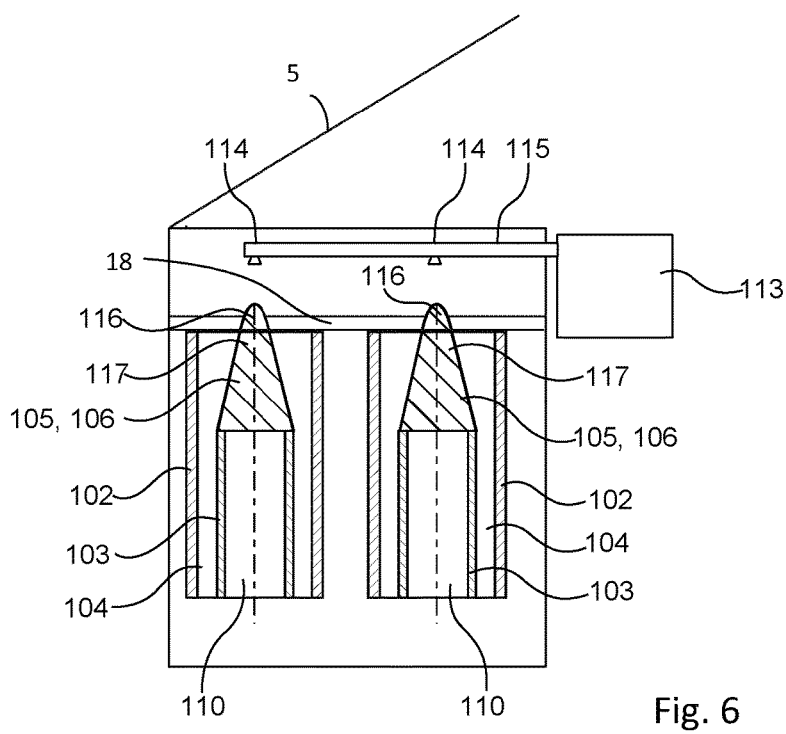
FIG. 6 is a schematic illustration of a further preferred type of filter cartridge together with sections of hood and a pulse cleaning compressed air device.

When the end piece 116 and the base body 117 of the cap 106 are formed separately from each other the end piece 116 of the cap 106 can be connected the pulse filter mounting structure 18 inside the weather protection hood as shown in FIG. 6, while the base body 117 of the cap 106 is connected to the filter cartridge 101. When a filter cartridge 101 is replaced from the downstream side of the pulse filter arrangement, the end pieces 116 of the caps 106 are retained in the pulse filter mounting structure 118.

FIG. 6 illustrates how filter cartridges of the preferred type are installed, with the cap 106 mounted to be retained in the mounting structure 18.

The person skilled in the art realizes that the present disclosure is not limited to the embodiments described above. The person skilled in the art further realizes that modifications and variations are possible within the scope of the appended claims, that variations to the disclosed embodiments can be understood and effected by the skilled person in practicing the claimed disclosure, from a study of the drawings, the disclosure, and the appended claims.

The invention claimed is:

1. An air filtering apparatus configured to provide intake air to an engine, said apparatus comprising:
   a filter chamber comprising an air inlet opening, and an air outlet opening;
   a weather protection hood arranged on an air inlet side of the filter chamber, said weather protection hood having an air intake opening facing downward and an outlet opening being connected to the air inlet opening of the filter chamber;
   a pulse filter arrangement comprising one or more filters;
   a static filter arrangement located at the air outlet opening;
   wherein the pulse filter arrangement is arranged inside the weather protection hood and in that a maintenance space is provided in the filter chamber on a downstream side of the pulse filter arrangement, through which the filters of the pulse filter arrangement can be replaced.

2. The air filtering apparatus of claim 1, wherein the filters of the pulse filter arrangement have a particle capturing surface, and wherein the pulse filters are arranged in the weather protection hood such that any particles released from the particle capturing surface during a pulse cleaning mode can fall freely from the filter elements and out through the air intake opening of the weather protection hood.

3. The air filtering apparatus of claim 1, wherein the filters of the pulse filter arrangement each comprise filter elements forming a cylindrical and/or conical particle capturing surfaces, and a mounting plate or fixture, and the filter elements are positioned such that the particle capturing surfaces thereof are substantially vertical or facing downward.

4. The air filtering apparatus of claim 1, wherein weather protection hood comprises:
   a pulse filter mounting structure configured to divide the interior space of the weather protection hood into an upstream space on an upstream side of the mounting structure and a downstream space on a downstream side of the mounting structure, and wherein the pulse filters are arranged in the upstream space, the upstream space being accessible from the maintenance space through one or more hatches or cover plates provided in a wall between the weather protection hood and maintenance space of the filter chamber.

5. The air filtering apparatus of claim 1, wherein the maintenance space is provided upstream of the static filter arrangement, and the static filter arrangement comprises a plurality of static filters, which are arranged to be accessible from the maintenance space.

6. The air filtering apparatus of claim 1, wherein the weather protection hood further comprises:
   a plurality of weather protection hoods, each comprising a pulse filter arrangement, are connected to air inlet openings in the filter chamber.

7. The air filtering apparatus of claim 6, wherein the weather protection hoods are arranged above one another.

8. The air filtering apparatus of claim 6, wherein the plurality of weather protection hoods comprise between 2 and 10 weather protection hoods with pulse filter arrangements connected to the air inlet openings of the filter chamber.

9. The air filtering apparatus of claim 1, further comprising:
   an engine air intake duct connected to the outlet opening of the filter chamber.

10. The air filtering apparatus of claim 9, wherein the engine air intake duct is configured to provide intake air to a gas turbine.

* * * * *